United States Patent
Omary et al.

(12)

(10) Patent No.: US 6,436,450 B1
(45) Date of Patent: Aug. 20, 2002

(54) BRASSICA VEGETABLE COMPOSITION AND METHOD FOR MANUFACTURE OF SAME

(75) Inventors: María Botero Omary, Riverside; Saul C. Ovalle, Temecula; Donald J. Pusateri, Hemet, all of CA (US); Prabhakar Kasturi, Hoffman Estates, IL (US)

(73) Assignee: Access Business Group International LLC, Ada, MI (US)

( * ) Notice: Subject to any disclaimer, the term of this patent is extended or adjusted under 35 U.S.C. 154(b) by 23 days.

(21) Appl. No.: 09/733,245

(22) Filed: Dec. 8, 2000

(51) Int. Cl.[7] .............................................. A61K 35/78
(52) U.S. Cl. ...................................................... 424/755
(58) Field of Search ......................................... 424/755

(56) References Cited

U.S. PATENT DOCUMENTS

| 5,686,108 A | | 11/1997 | Pusateri et al. ............. 424/464 |
| 5,725,895 A | | 3/1998 | Fahey et al. ................... 426/49 |
| 5,770,217 A | | 6/1998 | Kutilek, III et al. ......... 424/442 |
| 5,968,505 A | * | 10/1999 | Fahey et al. ................ 424/94.1 |
| 5,968,567 A | | 10/1999 | Fahey et al. .................. 426/49 |

* cited by examiner

*Primary Examiner*—Christopher R. Tate
*Assistant Examiner*—Kailash C. Srivastava
(74) *Attorney, Agent, or Firm*—Brink Hofer Gilson & Lione; G. Peter Nichols

(57) ABSTRACT

A composition includes at least one processed dehydrated brassica vegetable containing glucosinolates and endogenous myrosinase enzyme, wherein the endogenous myrosinase enzyme converts the glucosinolates into isothiocyanates when the composition is ingested. A method of making the composition is also provided.

8 Claims, 2 Drawing Sheets

BRASSICA VEGETABLE COMPOSITION AND METHOD FOR MANUFACTURE OF SAME

BACKGROUND

The present invention relates to a processed dehydrated brassica vegetable composition and a method of its manufacture.

Broccoli and other brassica vegetables may be helpful in fighting cancer and other diseases. These vegetables contain glucosinolates such as glucoraphanin that can be converted into biologically useful isothiocyanates. These vegetables also contain endogenous myrosinase enzyme, which converts glucosinolates into isothiocyanates such as sulforaphane. Isothiocyanates, especially sulforaphane, can help the body fight disease by inducing phase II enzymes that are present in the human body and that are capable of detoxifying carcinogens. For this reason, broccoli and other brassica vegetables are often included in dietary and nutritional supplements.

U.S. Pat. No. 5,882,646 (the '646 patent) discloses a dietary supplement containing a brassica vegetable and an exogenous source of myrosinase enzyme. The supplement of the '646 patent contains pre-formed isothiocyanates such as sulforaphane rather than glucosinolates. Unfortunately, pre-formed isothiocyanates are not stable compounds. Isothiocyanates can degrade over time, thereby losing their beneficial biological activity.

Also, the process of making the dietary supplement of the '646 patent inactivates the endogenous myrosinase enzymes in the brassica vegetables. Unfortunately, the inactivation of the endogenous myrosinase in the '646 patent requires the addition of exogenous myrosinase enzyme, and therefore does not capitalize on the naturally-occurring endogenous myrosinase in the processed vegetable.

Accordingly, a composition is needed that contains stable glucosinolates rather than unstable, pre-formed isothiocyanates. The stable glucosinolates are converted into biologically useful isothiocyanates upon ingestion. This way, the isothiocyanates are not given an opportunity to degrade before they are ingested. Also, a process of making a brassica vegetable composition is needed that retains the activity of the endogenous myrosinase enzyme during processing while preventing the endogenous myrosinase enzyme from prematurely converting a substantial amount of the glucosinolates into unstable isothiocyanates.

SUMMARY OF THE INVENTION

The compositions and methods of this invention solve at least some of the problems of the prior art. Specifically, in the present invention, brassica vegetables are processed such that the natural myrosinase enzyme endogenous to the brassica vegetables remains intact throughout the processing. The composition produced by the process contains glucosinolates and active endogenous myrosinase enzyme. Then, when the composition is ingested by a human (or introduced into another aqueous environment), the endogenous myrosinase enzyme converts the glucosinolates into biologically useful isothiocyanates.

As used herein, "endogenous myrosinase enzyme" refers to myrosinase enzyme that is produced from within a particular brassica vegetable. "Exogenous myrosinase enzyme" refers to myrosinase enzyme that is introduced to a particular brassica vegetable from outside of that vegetable. For example, myrosinase enzyme that is endogenous to horseradish root is exogenous with respect to broccoli.

In one aspect of the invention, a composition comprises at least one processed dehydrated brassica vegetable containing glucosinolates and endogenous myrosinase enzyme, wherein the endogenous myrosinase enzyme converts the glucosinolates into isothiocyanates when the composition is ingested.

In another aspect of the invention, a method of making a processed dehydrated brassica vegetable composition is provided. The method comprises (a) chopping at least one brassica vegetable in such a way that the myrosinase endogenous to the brassica vegetable converts only an insubstantial amount of glucosinolates into isothiocyanates; (b) blanching the at least one brassica vegetable in such a way that the activity of the endogenous myrosinase enzyme is preserved; (c) dehydrating the at least one brassica vegetable in such a way that the activity of the endogenous myrosinase enzyme is preserved; and (d) grinding the at least one brassica vegetable into a powder such that, when the powder is ingested, the endogenous myrosinase enzyme converts the glucosinolates into isothiocyanates.

The above and other aspects and advantages of the present invention will become apparent from the following figures and the detailed description of the preferred embodiments. Note that all percentages referred to in this document are weight percentages unless otherwise indicated.

DETAILED DESCRIPTION OF THE PREFERRED EMBODIMENTS

Generally, the composition of the present invention contains process dehydrated brassica vegetables. Preferred brassica vegetables that are used to make the processed dehydrated brassica vegetable composition include broccoli (*Brassica oleracea*) and horseradish root (which is of the family Brassicaceae and genus Armoracia). Recently harvested broccoli and horseradish root are preferred. Preferably, the recently-harvested broccoli is whole or in the form of broccoli heads (floret-cut).

Preferably, the horseradish root is fresh-refrigerated horseradish root, wherein the horseradish root is not subjected to more than 3 months of storage time under ideal storage conditions. In another preferred embodiment, the horseradish root has been freeze-dried or air-dried or otherwise "gently" dried, so as to retain the activity of its endogenous myrosinase enzyme.

Although fresh vegetables are preferred, broccoli and horseradish root that have been subjected to short-term (3 months or less) or long-term storage may still be used.

Other acceptable brassica vegetables include, but are not limited to, cabbage, kale, cauliflower, mustard greens, kohlrabi, brussels sprouts, radish, watercress and arugula. All references to broccoli and/or horseradish root elsewhere in this specification are not intended to limit the described composition. Substitution of broccoli and horseradish root with other brassica vegetables is contemplated.

Figure 1:
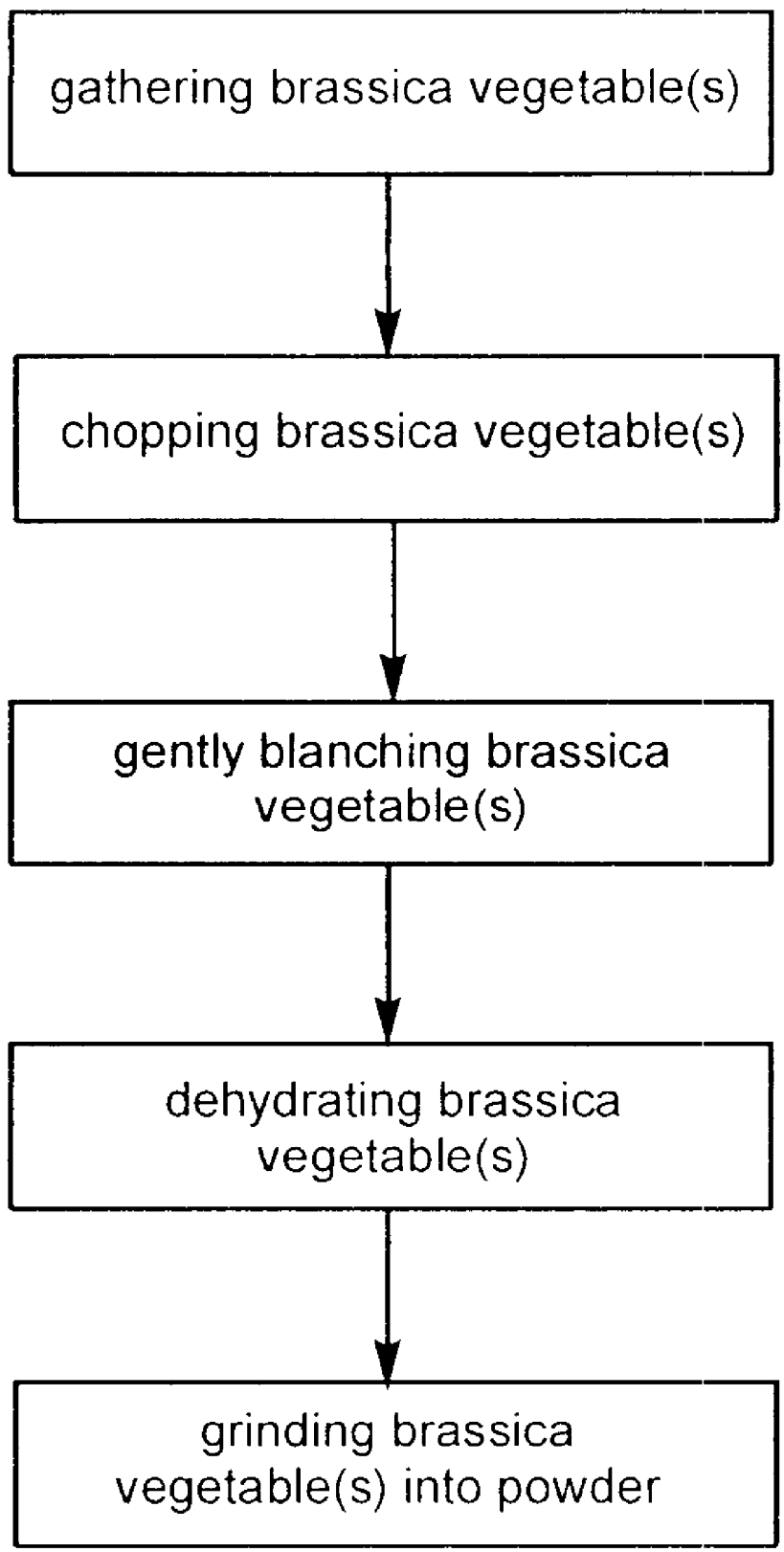
FIG. 1 shows a preferred method for making a processed dehydrated brassica vegetable composition.

Referring to FIG. 1, a process is shown for making a preferred brassica vegetable composition. In the first step, at least one brassica vegetable is gathered. Preferably, a mixture of broccoli plants and coarse horseradish root is gathered. Preferably, the mixture contains at least about 70% broccoli and at least about 2% horseradish root. More preferably, the mixture contains at least about 80% broccoli and at least about 3% horseradish root. Most preferably, the mixture contains from about 90% to about 95% broccoli and from about 5% to about 10% horseradish root. The weight percentages can be measured on a dry and/or a wet-weight basis.

Optionally, the gathered brassica vegetables can be washed at this time, as well as surface-treated to minimize microbial food safety hazards. The surface treatment can be any of those that are well known in the art. For example, the Food and Drug Administration produces a "Guide to Minimize Microbial Food Safety Hazards for Fresh Fruits and Vegetables" that discloses a number acceptable washes and chemical treatment procedures. Copies of the guide are available through the Food Safety Initiative Staff, HFS-32, of the Food and Drug Administration in Washington D.C.

In FIG. 1, the next step involves chopping the brassica vegetable into large, coarse pieces. Chopping the brassica vegetable in sufficiently large chunks (rather than macerating or homogenizing the brassica vegetables into a fine puree) prevents the active endogenous myrosinase enzyme from prematurely converting the glucosinolates in the brassica vegetable into unstable isothiocyanates. If the conversion occurs prematurely, the isothiocyanates are not likely to be stable enough to survive the remaining processing steps.

During the chopping process, it is foreseeable that an insignificant amount of glucosinolates may be prematurely converted into isothiocyanates. This is because the fresh vegetables contain both endogenous glucosinolates and endogenous myrosinase enzyme. When some of the cell walls are destroyed during chopping, some of the endogenous myrosinase enzyme may prematurely convert the glucosinolates into isothiocyanates. Preferably, less than about 10% of the glucosinolates are converted during chopping, more preferably, less than about 5%.

In FIG. 1, the next step is gently blanching, preferably using steam blanching techniques, the chopped brassica vegetable. The phrase "gently blanching" means that the brassica vegetable is blanched in conditions that do not inactivate the endogenous myrosinase enzyme. This is in contrast to the blanching methods of the prior art, which inactivated substantially all of the endogenous myrosinase. See the '646 patent at col. 2 line 59 to col. 3 line 3.

Gentle blanching is achieved by minimizing the brassica vegetable's exposure to steam. It is preferred that the vegetable is exposed to steam during blanching for less than about 5 minutes, preferably less than about 3 minutes, more preferably for about 2 minutes.

During gentle blanching, it is foreseeable that an insignificant amount of endogenous myrosinase enzyme may be inactivated. Preferably, less than about 10% of the endogenous enzyme is inactivated, more preferably, less than about 5%.

The next step is dehydrating the blanched brassica vegetable. The brassica vegetable is dehydrated carefully so that the brassica vegetable retains the activity of endogenous myrosinase enzyme. This can be achieved by using a two-step dehydration procedure, wherein the first step primarily drives water out of the vegetable reasonably quickly, and the second step continues the dehydration process in milder conditions so as not to inactivate the endogenous myrosinase enzyme.

An example of a two-step procedure follows: (1) heating the brassica vegetable to a first temperature of no more than about 280° F. for from about 40 to about 60 minutes; and (2) subsequently heating the brassica vegetable to a second temperature that is less than about 80° F. for from about 30 to about 50 minutes. Another example of the two-step procedure follows: (1) heating the brassica vegetable at a first temperature of no more than 260° F. for from about 45 to about 55 minutes; and (2) subsequently heating the brassica vegetable to a second temperature that is less than 80° F. for from about 35 to about 45 minutes.

In each example, the first dehydration step is a more intense heating than the second step. In the first dehydration step, because so much of the energy is used to drive off the water, very little of the endogenous myrosinase enzyme is inactivated. The most preferred duration for the first dehydration step is about 50 minutes.

In the milder, second dehydration step, the temperature should not be higher than 80° F., otherwise the endogenous myrosinase can be inactivated. The most preferred time duration for the second step is about 40 minutes.

During dehydration, it is foreseeable that an insignificant amount of endogenous myrosinase enzyme may be inactivated. Preferably, less than about 10% of the endogenous enzyme is inactivated, more preferably, less than about 5%.

In FIG. 1, the final step after dehydration is grinding the dehydrated brassica vegetable into a powder. The grinding can be carried out using any tools and methods that are known in the art.

Figure 2:
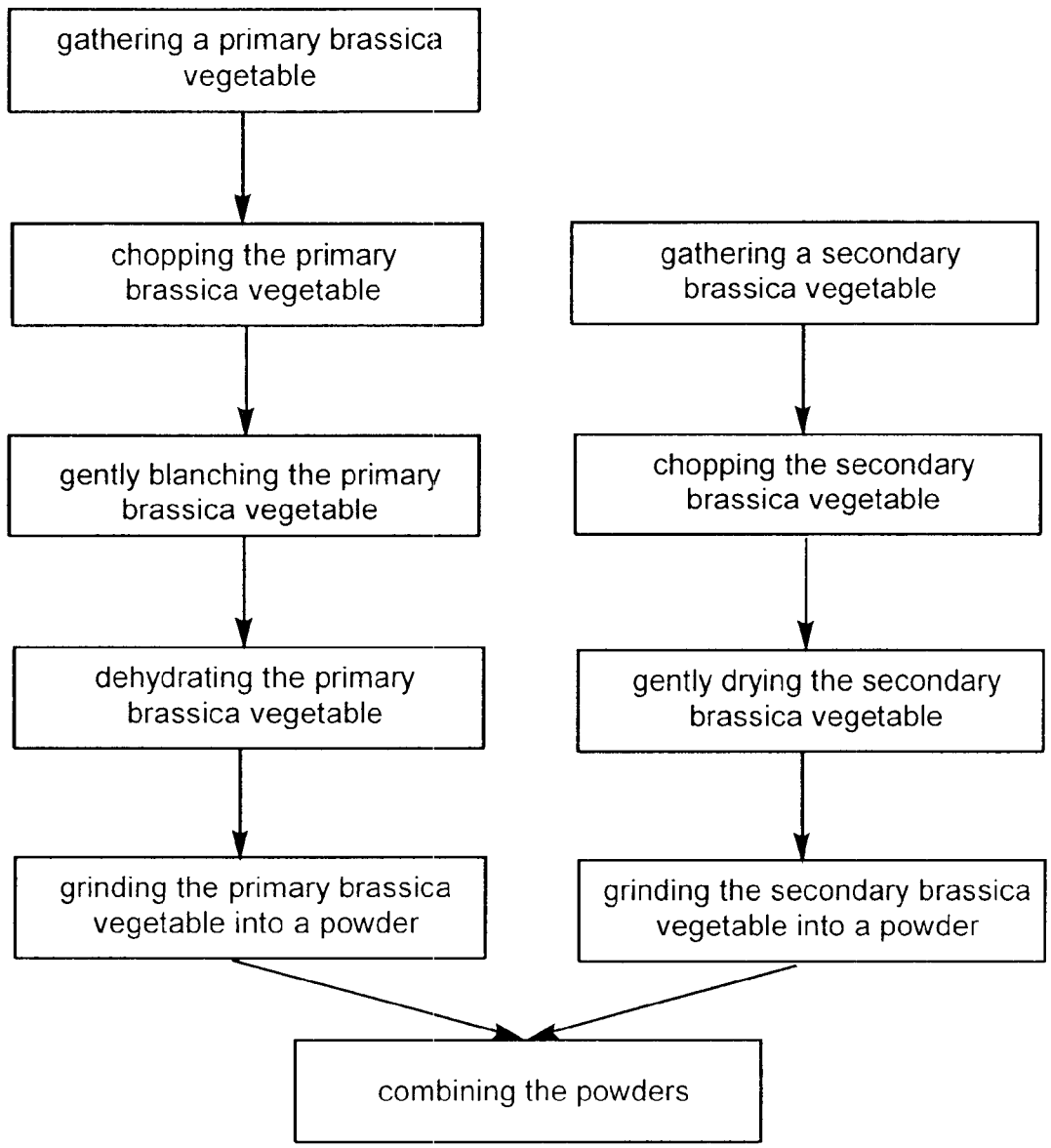
FIG. 2 shows another preferred method for making a processed dehydrated brassica vegetable composition.

Referring to FIG. 2, another method of making the processed dehydrated brassica vegetable composition is shown. In this method, a primary and a secondary brassica vegetable are gathered, and they are processed in parallel. The "primary" brassica vegetable is so named because a greater quantity of the primary brassica vegetable will be processed and included in the final composition than of the secondary brassica vegetable. Preferably, the primary brassica vegetable is broccoli and the secondary brassica vegetable is horseradish root.

In FIG. 2, the primary brassica vegetable is gathered, chopped, gently blanched, dehydrated, and ground into a powder. The powder contains active glucosinolates and active endogenous myrosinase enzyme with respect to the primary brassica vegetable.

In FIG. 2, the secondary primary vegetable is gathered, chopped, gently dried, and ground into a powder. The gentle drying can be air drying or freeze-drying, or any other drying method known in the art that allows the myrosinase enzyme endogenous to the secondary primary vegetable to retain its activity.

In FIG. 2, the final step is to combine the powder produced from processing the primary brassica vegetable with the powder produced from processing the secondary brassica vegetable. Preferably, the combination of powders contains more primary brassica vegetable powder than secondary brassica vegetable powder. The preferred percentages of primary and secondary brassica vegetable powder in the combination of powders is as follows: the combination should comprise at least about 70% primary brassica vegetable powder and at least about 2% secondary brassica vegetable powder; preferably, at least about 80% primary brassica vegetable powder and at least about 3% secondary brassica vegetable powder; and most preferably, from about 90% to about 95% primary brassica vegetable powder, and from about 5% to about 10% secondary brassica vegetable powder.

The resulting product from the processes described in FIG. 1 and in FIG. 2 is a brassica vegetable powder containing active myrosinase enzyme endogenous to each processed brassica vegetable, and glucosinolates endogenous to each processed brassica vegetable. When the brassica vegetable powder is introduced to an aqueous environment (for example, when ingested by humans), the endogenous myrosinase enzyme promotes the conversion of the glucosinolates (such as glucoraphanin) to biologically useful isothiocyanates (such as sulforaphane). Sulforaphane is known to be a potent inducer of detoxifying phase 11 enzymes. Advantageously, during the above-mentioned conversion, only an insignificant amount of another group of glucosinolate hydrolysis products, nitrites, are produced. Preferably nitriles are produced in an amount of less than about a 1 to 5 ratio of nitriles to isothiocyanates, more preferably the ratio is about 1 to 10.

A preferred brassica vegetable powder can be included in a non-aqueous multivitamin and/or multimineral supplement or another non-aqueous based dietary or nutritional supplement. The brassica vegetable powder can be included in a tablet delivery system, by itself or in combination with other dietary or nutritional supplements. The brassica vegetable powder can also be used in a non-aqueous food matrix, as well as other delivery systems known in the art.

It should be understood that a wide range of changes and modifications could be made to the compositions and methods of this invention. It is therefore intended that the foregoing figures and description illustrate rather than limits this invention, and that it is the following claims, including all equivalents, which define this invention.

What is claimed:

1. A composition comprising at least one gently blanched and dehydrated brassica vegetable containing glucosinolates and endogenous myrosinase enzyme that has not been inactivated, wherein the endogenous myrosinase enzyme converts the glucosinolates into isothiocyanates when the composition is ingested.

2. The composition of claim 1 wherein the gently blanched and dehydrated brassica vegetable is selected from the group consisting of broccoli, horseradish root, cabbage, kale, cauliflower, mustard greens, kohlrabi, brussels sprouts, radish, watercress, arugula, and mixtures thereof.

3. The composition of claim 1 wherein the gently blanched and dehydrated brassica vegetable is selected from the group consisting of broccoli, horseradish root, and mixtures thereof.

4. The composition of claim 1 wherein the composition is in the form of a dry powder.

5. The composition of claim 1 containing an insubstantial amount of isothiocyanates.

6. The composition of claim 1 containing an insubstantial amount of nitrites.

7. An improved dietary supplement, the improvement comprising a stable gently blanched and dehydrated brassica vegetable powder containing glucosinolates and endogenous myrosinase enzyme that has not been inactivated.

8. The composition of claim 1 containing no exogenous myrosinase enzyme.

* * * * *